Jan. 12, 1937.　　　L. C. ANTRIM　　　2,067,589
FERTILIZING STICK
Filed Oct. 8, 1935
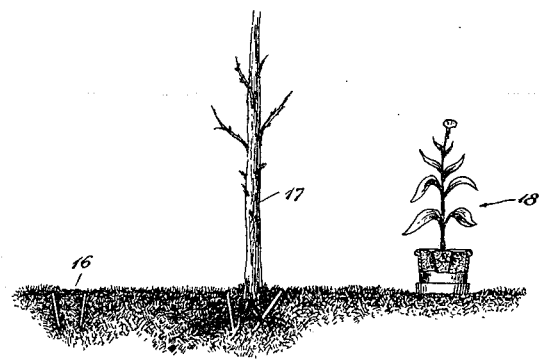
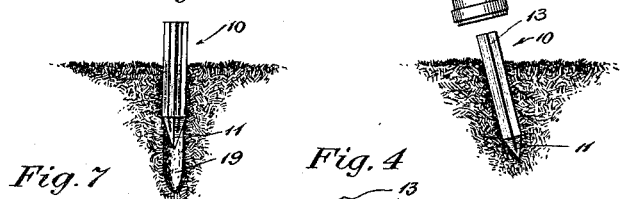
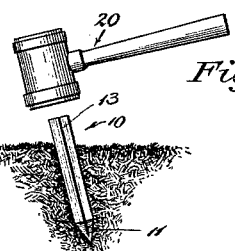
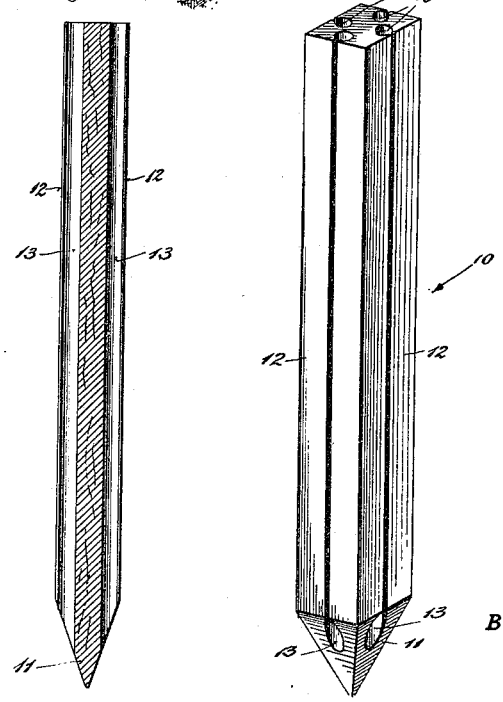
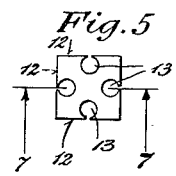
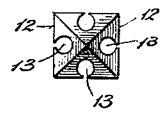
INVENTOR
Louis C. Antrim
BY
ATTORNEY Patented Jan. 12, 1937

2,067,589

UNITED STATES PATENT OFFICE 2,067,589

FERTILIZING STICK

Louis C. Antrim, New York, N. Y.

Application October 8, 1935, Serial No. 44,012

13 Claims. (Cl. 47—1)

This invention relates to the fertilization and conditioning of ground or soil adjacent the roots of growing plants and the like.

An object of this invention is to supply, in a practical and economical manner, a stimulating radioactive substance to the soil adjacent to the roots of the plants.

This is accomplished, according to the present invention, by storing in a rigid stick or spike of fibrous cellular imbibitory material a quantity of radioactive substance so that when the stick or spike is driven into the ground among the roots of a plant, the radioactivity of the substance may be received by the roots over long periods of time.

In the broader aspects of this invention, the stick may be composed of loose fibrous material matted together, or otherwise secured by a binder, so that it may be inserted in the ground as by burying the same adjacent the roots, or as by inserting the same in a hole prepared to receive it, or as by driving the same into the ground. If the latter is the preferred way of locating the stick containing the radioactive material among the roots of the plant, then the stick should be sufficiently rigid to permit of its forceful insertion into the ground.

The stick illustrated in my copending application, Serial No. 743,820, filed September 13, 1934, now Patent No. 2,032,608, is admirably suited for such use, and the radioactive substance may be incorporated in the stick either with or without plant food.

In my copending application above referred to, the stick or spike is formed of fibrous cellular imbibitory material such as peat moss held together in rigid form by a suitable binder and containing between the fibres plant food.

I have found, however, that the stick or spike may advantageously and satisfactorily be made of a piece of light open-grained, non-resinous wood such as balsa. This may be cut from boards or planks with ease and is comparatively inexpensive and light to ship. At the same time, I have found that balsa lends itself well to the purpose of the present invention, for the open pores and grain of the wood readily absorb surface moisture and transmit it to and among the roots of a plant. This wood holds and discharges gradually plant food which may be conveniently provided in the stick by soaking the same in a solution containing the plant food or a solution of plant food. Besides, it lends itself well to grooving and channeling to form aerating passages longitudinally of the stick, if desired.

As above stated, the radioactive substance may be contained in any suitable form of stick or holder wherein it will not be dissolved too rapidly. However, I have found that the use of a stick of balsa wood is particularly advantageous when it is desired to carry to and store adjacent the roots of a plant radioactive material, because the radioactive material in extremely weak solutions may be readily soaked into the balsa wood, the surplus applied allowed to drain off, and the stick eventually allowed to dry without substantial loss of the substance, which is extremely important because of the high cost of such materials.

In practicing the invention, I have found that some radioactive substances contain chemicals such as barium which are injurious to plant growth. A radioactive material which is satisfactory and which contains no known chemicals or substances injurious to plant growth when used in proper concentration is radium.

I have found, however, that mesothorium is preferable to radium because (1) it is cheaper; (2) it does not excessively activate the growth of the plant; (3) its period of activity is relatively short in comparison with radium, it being understood at present to be approximately seven years; and (4) when used in proper degree of concentration, it has no appreciably deleterious effects on the health or constitution of human beings or necessary bacteria life.

Other features and advantages of the invention will hereinafter appear.

In the accompanying drawing, which illustrates the present preferred form of the invention—

Figure 1 shows the way in which the sticks of the present invention may be placed in the ground adjacent the tree and the bare spot in a grass plot, and in the soil of a potted plant.

Fig. 2 shows one method of placing a stick of the present invention in the soil, the stick being shown as being pushed into a previously prepared hole.

Fig. 3 shows another method of placing the stick of the present invention in the ground, the stick being driven, in the manner of a stake, into the ground by a mallet.

Fig. 4 is a perspective view of the fertilizing stick of the present invention.

Fig. 5 is a top view of the stick.

Fig. 6 is a bottom view, or an end view, looking at the point.

Fig. 7 is a central longitudinal sectional view taken on the line 7—7 of Fig. 5.

In the past, many efforts have been directed towards feeding and nourishing plants, and supplying moisture to their roots in order to increase growth and luxuriance of foliage. It has been proposed to enrich with food the soil adjacent the roots of plants, and to sprinkle said soil with water in proper amounts, and at proper times. The object of all these means was to duplicate conditions felt to be ideal for plant growth and propagation, and, if said means were successful, there resulted a normally strong and healthy plant.

I have found, however, that it is possible to further stimulate a plant which already has adequate food and moisture available to its roots, this further stimulation being obtained by having present adjacent to these roots and in the proper proportions a suitable radioactive substance. If this radioactive substance is properly administered, a vigorous and luxuriant growth results which surpasses to a considerable extent that obtained without employing radioactivity, other conditions of soil and environment being equal.

In the present invention, the stick 10 is made from a piece of balsa wood having a virtually square cross-section, although a rectangular or other conveniently shaped section may be used instead. The end 11 of the stick 10 is pointed, thereby forming a stake adapted to be driven or forced into the ground. Each side 12 of the stick 10 is routed, so that a slot or groove 13 extends longitudinally for the full length of the side.

The grooves 13 in the stick are virtually circular in section, and at the outer faces of the sides 12 the walls of said grooves almost close upon themselves, so that only narrow longitudinal slits appear in the faces. Thus, when the stick is driven into the ground, the almost closed-in walls of the grooves tend to keep the earth out of said grooves, and tend to keep these free for the passage of moisture, or for occupation by air.

Thus, the stick of the present invention is also adapted to aerate the soil wherein it is placed, and to permit surface moisture to readily reach the roots of the plant, and to thereby carry to these roots particles of the radioactive substance and fertilizing substances used in impregnating the stick.

It is to be noted that the longitudinal grooves or channels 13 communicate at all points with the earth surrounding the stick, and yet are adapted to resist clogging when the stick is driven in. The ability of the stick to secure and store moisture is important; since the material of the stick is readily absorbent, and since the presence of surface water due to rain, etc., will result in moisture passing along the grooves of the stick, said moisture is absorbed freely until the stick is saturated. The moisture that saturates the stick will pass into the surrounding earth whenever the latter becomes dry, and will carry with and to the roots of the plant the materials used in impregnating the stick.

For the purpose of securing substantial plant stimulation, the stick of the present invention is impregnated with a solution having about one part of mesothorium containing no impurities harmful to plants to one billion parts of water. The substance mesothorium is either of two radioactive products intermediate between thorium and radiothorium, and its presence in the soil about the roots of plants causes marked stimulation and growth of the plants, as above stated. In addition to the treatment with mesothorium, it is also possible to impregnate the sticks with a solution of fertilizing salts, and for this purpose sodium nitrate, superphosphates, etc., may be used.

The sticks of the present invention may be made in any suitable length or thickness, depending upon the plants with which they are intended to be used. For instance, as shown at the left of Fig. 1, when the sticks are used to restore dormant sod 16, they are preferably ½" across and 6" long. When used for small trees 17, as shown in the central part of Fig. 1, they are preferably 1½" across and 18" long. For small potted plants 18, such as shown on the right of Fig. 1, they may be ⅜" across and 4" long. Of course, it should be understood that these dimensions are merely suggestive, and that the invention is in no way limited thereto.

The fertilizing sticks of the present invention may be placed in the ground in two ways. For instance, as shown in Fig. 1, a hole 19 may be first made in the ground with a drill or other pointed implement, and then the stick 10 may be inserted in this hole and pressed down by hand or by foot. As shown in Fig. 3, the sticks 10 may be driven into the soil by the use of a mallet 20. This is the simplest and easiest way of applying the sticks, especially when the sticks are long as, for instance, those located near the roots of the tree 17 shown in Fig. 1.

It should be understood that the broader aspects of this invention embrace the conditioning of soil adjacent the roots of plants with a radioactive substance, and this latter may be contained in loose or matted fibrous materials adapted to be buried adjacent said roots, or contained in other means suitable to be placed into the earth.

From the above it will be seen that the preferred plant stimulating stick of the present invention is convenient to use because it is merely necessary to drive or push it into the ground. It may be conveniently packed and sold in prepared form ready for use, and is economical in that neither the radioactive substances nor any nourishing substances that may be used are wasted; but a sufficient and desired quantity of these is brought into close proximity with the roots of the plant, so as to be most efficient.

As many sticks as desired may be driven into the soil around the roots of the plant, depending upon the condition of the soil, and the nature, size, and condition of growth of the plant itself.

Variations and modifications may be made within the scope of this invention and portions of the improvements may be used without others.

Having thus described the invention, what is claimed as new and for which it is desired to obtain Letters Patent, is:—

1. A fertilizing device comprising a spike made of wood and impregnated with a solution containing mesothorium, said spike being adapted to be driven into the ground closely adjacent the roots of a plant.

2. A fertilizing device for plants comprising a spike made of wood and impregnated with a solution containing radioactive material free from impurities harmful to plant life, said spike being adapted to be driven into the ground closely adjacent the roots of a plant.

3. A fertilizing device comprising a spike made of wood and impregnated with a solution containing mesothorium and plant food, said spike being adapted to be driven into the ground closely adjacent the roots of a plant.

4. A fertilizing device comprising a spike made of balsa wood and impregnated with a solution containing mesothorium, said spike being adapted to be driven into the ground closely adjacent the roots of a plant.

5. A fertilizing device comprising a spike made of open grained substantially non-resinous wood and impregnated with a solution containing mesothorium, said spike being adapted to be driven into the ground closely adjacent the roots of a plant.

6. A fertilizing device for plants comprising a spike made of open grained substantially non-resinous wood and impregnated with a solution containing radioactive material free of impurities harmful to plant life, and containing plant food, said spike being adapted to be driven into the ground closely adjacent the roots of a plant.

7. A plant stimulating device comprising a spike of wood treated with a radioactive substance free from impurities harmful to plant life, said spike being adapted to be driven into the ground closely adjacent the roots of a plant.

8. A plant stimulant comprising a spike of balsa wood adapted to be forced into the ground closely adjacent the roots of plants, said spike having longitudinal grooves therein for the passage of moisture, and said spike being treated with mesothorium.

9. A sharpened fertilizing spike adapted to be forced into the ground closely adjacent the roots of plants, and having longitudinal grooves therein adapted to communicate with the surrounding earth, said grooves being narrow and partially enclosed so as to stay practically unfilled with earth when the spike is being forced into the ground.

10. A plant stimulating device comprising a square spike of wood adapted to be driven in the ground, amongst the roots of plants, said spike having longitudinal grooves in the sides which communicate with the surrounding earth and which are adapted to remain substantially free for the passage of moisture when the spike is driven in the ground, and said spike being impregnated with mesothorium and activating the moisture as it passes through the spike to the surrounding ground and adjacent roots.

11. A fertilizing device comprising a spike of wood substantially square in cross-section having longitudinal grooves in its sides, and impregnated with a solution containing mesothorium, said spike being adapted to be driven into the ground closely adjacent the roots of a plant.

12. A fertilizing device comprising a spike of wood having moisture conducting channels extending from end to end of the spike, said spike being adapted to be driven into the ground closely adjacent the roots of a plant.

13. A fertilizing device comprising a spike of wood having moisture conducting channels extending from end to end of the spike, said channels each having an open side at a side of the spike, said spike being adapted to be driven into the ground closely adjacent the roots of a plant.

LOUIS C. ANTRIM.